(12) United States Patent
Dey et al.

(10) Patent No.: US 10,324,947 B2
(45) Date of Patent: Jun. 18, 2019

(54) LEARNING FROM HISTORICAL LOGS AND RECOMMENDING DATABASE OPERATIONS ON A DATA-ASSET IN AN ETL TOOL

(71) Applicant: Informatica LLC, Redwood City, CA (US)

(72) Inventors: Atreyee Dey, Bangalore (IN); Sanjay Kaluskar, Bangalore (IN); Udayakumar Dhansingh, Cupertino, CA (US)

(73) Assignee: Informatica LLC, Redwood City, CA (US)

( * ) Notice: Subject to any disclaimer, the term of this patent is extended or adjusted under 35 U.S.C. 154(b) by 305 days.

(21) Appl. No.: 15/139,186

(22) Filed: Apr. 26, 2016

(65) Prior Publication Data

US 2017/0308595 A1    Oct. 26, 2017

(51) Int. Cl.

| | |
|---|---|
| *G06F 7/00* | (2006.01) |
| *G06F 17/30* | (2006.01) |
| *G06F 16/25* | (2019.01) |
| *G06N 20/00* | (2019.01) |
| *G06F 16/28* | (2019.01) |
| *G06F 16/23* | (2019.01) |
| *G06F 16/2457* | (2019.01) |
| *G06F 16/9032* | (2019.01) |

(52) U.S. Cl.
CPC ........ *G06F 16/254* (2019.01); *G06F 16/2358* (2019.01); *G06F 16/24575* (2019.01); *G06F 16/258* (2019.01); *G06F 16/283* (2019.01); *G06F 16/90324* (2019.01); *G06N 20/00* (2019.01)

(58) Field of Classification Search
CPC ......... G06F 17/30592; G06F 17/30563; G06F 17/30528; G06F 17/30569
See application file for complete search history.

(56) References Cited

U.S. PATENT DOCUMENTS

| | | | |
|---|---|---|---|
| 7,698,170 B1 * | 4/2010 | Darr ................... | G06Q 30/0609 705/26.35 |
| 7,720,720 B1 * | 5/2010 | Sharma .............. | G06Q 30/0631 705/26.7 |
| 8,200,661 B1 * | 6/2012 | Pearce ................ | G06F 16/9535 707/721 |
| 8,978,114 B1 * | 3/2015 | Kaushik .............. | G06F 21/6218 726/2 |

(Continued)

*Primary Examiner* — Hasanul Mobin
(74) *Attorney, Agent, or Firm* — Amardeep S. Grewal; Reed Smith LLP

(57) ABSTRACT

A data analysis server maintains database operation history data and context data for database operations performed on tables by a set of training users. The data analysis server builds predictive models for using the maintained data to recommend database operations and operands to a set of guided users. The data analysis server trains the predictive models by determining and weighting features derived from context data that are predictive of performing database operations to tables with similar context data. Using the predictive model, the data analysis server generates recommended database operations and operands based on context data received from a data analysis application of a guided user and sends the recommendations to the data analysis application for presentation to the guided user.

21 Claims, 8 Drawing Sheets

(56) References Cited

U.S. PATENT DOCUMENTS

| | | | |
|---|---|---|---|
| 9,646,262 B2* | 5/2017 | Phillipps | G06N 20/00 |
| 9,686,086 B1* | 6/2017 | Nguyen | H04L 12/1822 |
| 9,881,059 B2* | 1/2018 | Mantrach | G06F 16/24578 |
| 2010/0114899 A1* | 5/2010 | Guha | G06F 16/9535 |
| | | | 707/741 |
| 2011/0093436 A1* | 4/2011 | Zha | G06F 17/30592 |
| | | | 707/639 |
| 2012/0102007 A1* | 4/2012 | Ramasubramanian | |
| | | | G06F 17/30563 |
| | | | 707/705 |
| 2013/0276114 A1* | 10/2013 | Friedrichs | G06F 21/56 |
| | | | 726/23 |
| 2014/0372346 A1* | 12/2014 | Phillipps | G06N 20/00 |
| | | | 706/12 |
| 2015/0170184 A1* | 6/2015 | Kim | G06Q 30/0226 |
| | | | 705/14.27 |
| 2016/0055426 A1* | 2/2016 | Aminzadeh | G06N 99/005 |
| | | | 706/12 |
| 2016/0092475 A1* | 3/2016 | Stojanovic | G06F 3/04847 |
| | | | 707/805 |
| 2016/0117087 A1* | 4/2016 | Couris | G06F 8/38 |
| | | | 715/771 |
| 2016/0188596 A1* | 6/2016 | Keggi | G06F 16/24578 |
| | | | 703/11 |
| 2017/0132525 A1* | 5/2017 | Rozier | G06N 20/00 |

* cited by examiner

| id | type | nulls | unique | pattern | domain | maxvalue | minvalue | operation |
|---|---|---|---|---|---|---|---|---|
| L431L431 | Integer | 0 | 77.71 | <NUMBER> | None | 9832 | 12 | expr:expr |
| T360T360 | String | 0 | 52.81 | @<WORD> | Handle | -1 | -1 | validateDomain |
| E540E540 | String | 0 | 100 | <WORD>@<WORD>.<WORD> | emailAddress | -1 | -1 | validateDomain |
| E540E540 | String | 0 | 100 | <WORD>@<WORD>.<WORD> | emailAddress | -1 | -1 | extractDomainName |
| E540E540 | String | 0 | 100 | <WORD>@<WORD>.<WORD> | emailAddress | -1 | -1 | strikeironEmailValidation |
| F623F623 | String | 0 | 96.79 | <WORD> | None | -1 | -1 | expr:CONCATENATE |
| L235L235 | String | 0 | 100 | <WORD> | None | -1 | -1 | expr:CONCATENATE |
| P500P500 | String | 0 | 100 | <NUMBER>-<NUMBER> | None | -1 | -1 | splitText |
| E540E540 | String | 0 | 100 | <WORD>@<WORD>.<WORD> | emailAddress | -1 | -1 | strikeironEmailValidation |
| L236L236 | Datetime | 0 | 51.2 | <NUMBER>/<NUMBER>/<NUMBER> | Date | 1.42E+12 | 1.39E+12 | extractFiscalQuarterAndYear |
| L236L236 | Integer | 0 | 0.8 | <NUMBER> | None | 4 | 1 | expr:CONCATENATE |
| O130O130 | String | 0 | 0.8 | <WORD> | agreement | -1 | -1 | Agg |
| S332S332 | String | 0 | 0.8 | <WORD>:<WORD> | None | -1 | -1 | Agg |
| C550C550 | String | 0 | 97.79 | <NUMBER>-<NUMBER>-<NUMBER> | None | -1 | -1 | splitText |

FIG. 3

FIG. 4

LEARNING FROM HISTORICAL LOGS AND RECOMMENDING DATABASE OPERATIONS ON A DATA-ASSET IN AN ETL TOOL

BACKGROUND

Field of Disclosure

The disclosure generally relates to extract, transform and load data processes in database management systems and data warehouses, and, more specifically, to computer executed methods for determining and recommending database operations for data displayed in a data viewing and editing environment.

Fields of Classification: 707/602, 707/709, 707/767

Background Information

In the field of data warehousing, data from multiple external data sources typically transitions through an extract, transform, and load (ETL) process when being ingested into an internal database management system. As a part of the ETL process, the data is (i) extracted from one or more data sources, (ii) programmatically transformed according to business and technical requirements of the internal data source, and (iii) loaded into a target data store of the internal database management system. Once in the system, the data may be manipulated by system users using various database operations. Often, users are working with vast amounts of data, and some users are unfamiliar the database operations that a database management application supports for processing the data, or do not know the most efficient ways to process data in the database management system. Gaining knowledge and experience sufficient to address this problem can be difficult and time consuming, especially for casual users, or users that work with many types of data.

SUMMARY

A data analysis server is configured to provide users who are less proficient with a data analysis application (guided users) with programmatically determined recommended database operations using a machine learning predictive model. The predictive model is learned from database operations input by advanced users (training users) on similar data in the database. The predictive model enables less skilled users to improve their efficiency in operating the database by improving the process of selecting which database operations are appropriate for data.

A data analysis server builds the predictive model for recommending database operations to users of an ETL tool using history data of database operations by prior database users. A data profiling module is configured to maintain context data for database tables and sets of tables (projects) presented to and manipulated by a selected group of users. Context data comprises metadata for tables and projects. A database operation history module is configured to maintain the history data for database operations on tables and projects. A database operation, as used herein, is a programmatic operation that is supported by the ETL and performed on specific data to produce a transformed or altered data set. Specific database operations include join (combine), union (merge), filter, formulas, lookup, column split, column add (data enhancement), pattern recognition and inconsistency rectification, data cleansing, data consistency, data standardization, etc. Database operations may further include operations on data such as mathematical operations, equations, and the like.

A database operation recommendation module is configured to build, train, and use the predictive model for recommending database operations to users. The database operation recommendation module trains the model using the maintained database operation history data and context data, thereby determining which context data is predictive of the application of certain database operations. To generate a recommendation for a guided user in real time during use of the database by the guided user, the database operation recommendation module receives context data for a particular table or project that is being accessed by the guided user and determines one or more recommended database operations to perform with respect to that table or project using the predictive model.

A graphical user interface of the data analysis application includes a data section, an information section, and various user interface controls. The data section is for displaying the tables for analysis. The information section is for displaying profiled information about the tables, based on the schema definitions of the tables. A composite data control is for receiving a database operation (equivalently, a database command) to unify the tables into a composite table based on at least one matching column among the tables. The composite data control may be multiple different controls for the various unifying database operations. A recommendation control of the UI is for displaying recommended database operations determined by the database operation recommendation module.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3 is an example data table illustrating features and classes for use in training a predictive model.

FIG. 4 illustrates an example of a user interface for viewing and manipulating data in a data analysis application according to one embodiment.

DETAILED DESCRIPTION

System Architecture

Figure 1:
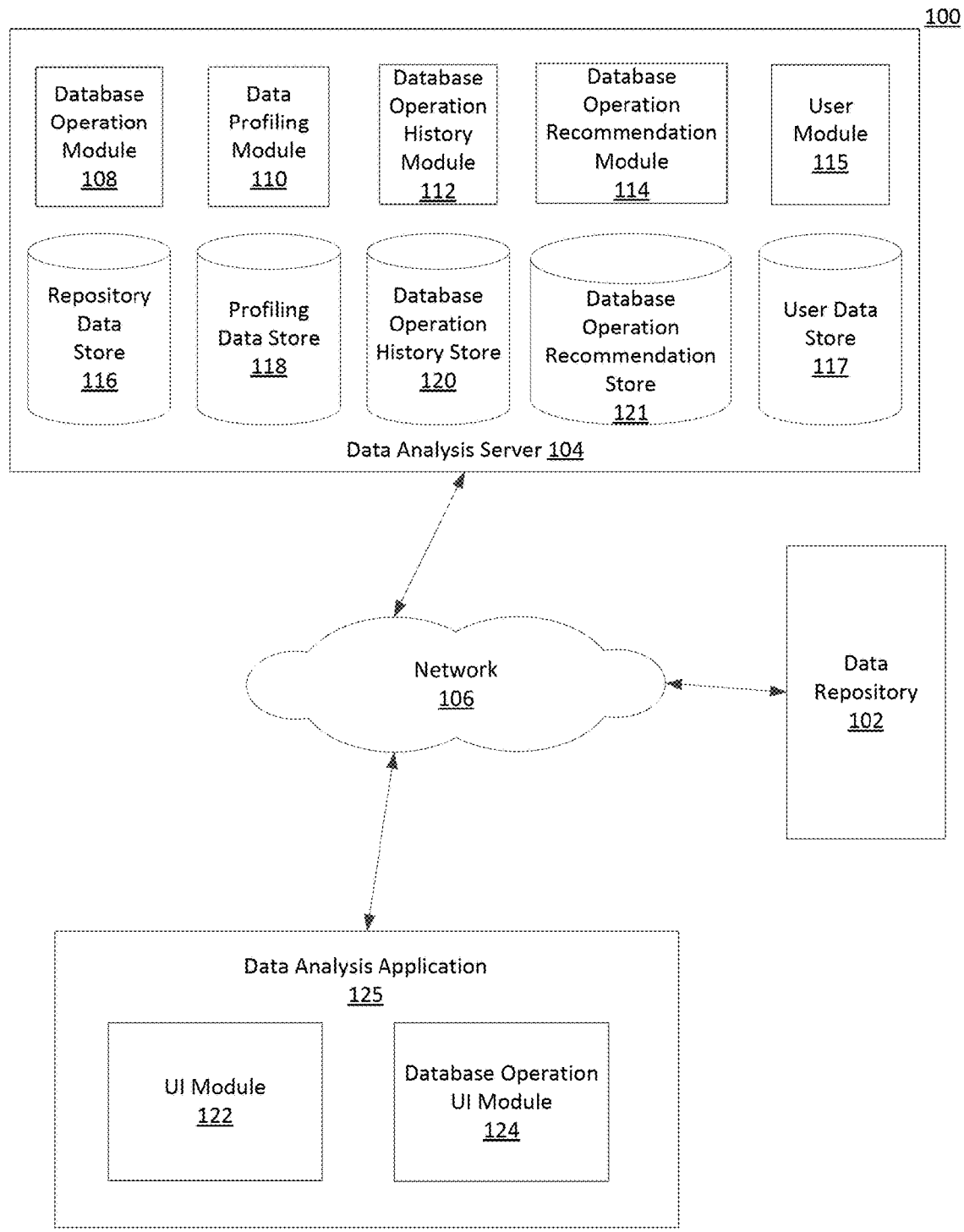
FIG. 1 is a high-level block diagram of a computing environment for generating predictive models from historical logs of database operations and recommending database operations on data in a data analysis application according to one embodiment.

FIG. 1 is a high-level block diagram of a computing environment 100 for generating predictive models from historical logs of database operations and recommending database operations on data in a data analysis application according to one embodiment.

As shown, the computing environment 100 includes data repositories 102, a data analysis server 104, and a data analysis application 125.

The data repositories 102 (also individually referred to herein as data repository 102) include one or more systems for managing data. Each data repository 102 provides a channel for accessing and updating data stored within the data repository 102. Data in a data repository 102 may be associated with users, groups of users, entities, and/or workflows. For example, a data repository 102 may be a customer relationship management (CRM) system or a human resource (HR) management system that stores data associated with all individuals associated with a particular entity. A data repository 102 may be a data source or an export target for an ETL process. Examples of data sources include databases, applications, and local files. Similarly, these sources can act as targets for exporting data. Common export targets include TABLEAU, SALESFORCE WAVE, and EXCEL.

The data analysis application 125 is a software application that enables users to manipulate data extracted from the data repositories 102 by the data analysis server 104 and select and specify database operations to be performed on single tables or multiple tables, and is one means for performing this function. In one embodiment, the data analysis application 125 provides data to users in the form of projects, which are sets of tables. The various modules of the data analysis application 125 are not native or standard components of a generic computer system, and provide specific functionality as described herein that extends beyond the generic functions of computer system. In addition, the functions and operations of the modules is sufficiently complex as to require an implementation by a computer system, and as such cannot be performed in any practical embodiment by mental steps in the human mind. Each of these components is described in greater detail below. The data analysis application 125 is device agnostic, and thus may be a desktop application, a mobile application or web-based application. To perform its various functions, the data analysis application 125 includes a user interface (UI) module 122 and a database operation UI module 124.

In some embodiments, the data analysis application 125 is part of a larger cloud architecture, along with various onsite and external sources and targets, as well as enrichment services involved in the processes described herein.

The UI module 122 receives data for display in the UI, generates a user interface corresponding to received data, populates the interface with the data received into a table or tables, displays data refinement recommendations based on a predictive model, and generates a column summary associated with one or more columns of the table or tables, and is one means for performing these functions. The generated user interface allows a user of the data analysis application 125 to view and interact with tables, including manipulating table entries and applying database operations to data.

The database operation UI module 124 provides one or more database operation controls for applying to data in the table(s) generated by the UI module 122, and is one means for performing this function. Specifically, the database operation UI module 124 provides controls that allow a user of the data analysis application 125 to select, specify and/or cause the application of database operations associated with the tables.

According to one embodiment, a user interface as provided by UI module 122 and database operation UI module 124 includes a graphically represented data section, an information section, and various graphically represented database operation controls. The data section of the UI is for displaying the tables for analysis. The information section of the UI is for displaying profiled information about the tables. The profiled information describes characteristics of the tables such as context data. A composite data control of the UI is a user interface element for receiving a command to unify two tables into a composite table based on at least one matching column among the tables. A recommendation control of the UI is a user interface element for displaying recommended database operations determined by the database operation recommendation module 114 using a predictive model. The UI is discussed in more detail below with respect to FIGS. 4 and 6.

For each database operation performed, the database operation UI module 124 transmits each database operation performed on the displayed table(s) to the database operation history module 112 in the data analysis server 104. Each database operation is represented by an operation identifier, which uniquely identifies the operation, for example by name, ID number, and an operation description, which indicates operands that were included with the database operation. The database operation history module 112 stores in the database operation history store 120 the database operations applied to the data. The database operations applied to the data over time are captured in the database operation history store 120 and any step in the database operation history can be undone, redone, or applied to different data. Database operations may be stored in the form of logs, as discussed below.

The data analysis server 104 extracts data from the data repositories 102, processes the data, and provides the processed data to the data analysis application 125 so that the data may be displayed to and manipulated by a user. To perform these functions, the data analysis server 104 includes a data extraction module 108, a data profiling module 110, and a database operation history module 112. Further, to store data related to these functions, the data profiling server 104 includes a repository data store 116, profiling data store 118, and a database operation history store 120. The various modules of the analysis server 104 are not native or standard components of a generic computer system, and provide specific functionality as described herein that extends beyond the generic functions of computer system. In addition, the functions and operations of the modules is sufficiently complex as to require an implementation by a computer system, and as such cannot be performed in any practical embodiment by mental steps in the human mind. Each of these components is described in greater detail below.

The data extraction module 108 is configured to identify data in the data repositories 102 that is to be extracted, retrieve that data from the data repositories 102 and store the data in the repository data store 116, and is one means for so doing. In operation, the data extraction module 108 identifies one or more data repositories 102 from which to extract data. The data extraction module 108 also identifies the specific data stored in the identified data repositories 102 that is to be extracted. The identification of the data repositories 102 and/or the specific data stored therein may be made based on instructions received from a user conducting a data profiling operation. Alternatively, such identification may be made based on one or more business logic definitions that specify external data sources from which to extract data.

The data extraction module 108 extracts the identified data from the data repositories 102 over the data access channels provided by the data repositories 102. In one embodiment, a data access channel is a secure data transfer protocol that allows the data extraction module 108 to communicate securely with a data repositories 102 to retrieve and transmit data to and from the data repositories 102. Once the data is extracted from the data repositories 102, the data extraction module 108 stores the data in the repository data store 116.

The data profiling module 110 processes the data extracted from the data repositories 102 and stored in the repository data store 116 to fully profile every column, row, and field of the data, and is one means for so doing. Profiling columns, rows, and data fields includes identifying data types, data domains, and other information about data values such as entry lengths, percent unique values, and percent blank values.

The database operation history module 112 receives and stores records of database operations applied to cells, tables, and projects, and is one means for so doing. In operation, when an database operation is applied to a cell, table, or project, the database operation history module 112 stores in the database operation history store 120 the particular database operation that was applied and to which data. Therefore, the database operations applied to the data over time are captured in the database operation history store 120.

A database operation, as used herein, is a programmatic operation, supported by the program code of the ETL system, and that performed on specific data to produce a transformed or altered data set. Database operations may be performed on tables or projects. Specific database operations include join (combine), union (merge), filter, formulas, lookup, column split, column add (data enhancement), pattern recognition and inconsistency rectification, data cleansing, data consistency, data standardization. Database operations may further include operations on data such as mathematical operations, equations, and the like. Database operations include:

TABLE 1

Database Operations

| Database Operation | Description |
| --- | --- |
| join | Joins sources based on a condition that matches one or more pairs of columns between the two sources. |
| union | Merges data from different sources with the same field names. |
| expr | Evaluates mathematical expression provided as operand. |
| filter | Filters rows in a table or column based on a specified conditions. |
| lookup | Returns a value from another database table or view. |
| column add | Adds a new column (for each row). The new column can be empty, have a default value or be populated based on an expression. |
| column split | Splits a column into multiple columns. Each resulting column has a part of the original column. |

TABLE 1-continued

Database Operations

| Database Operation | Description |
| --- | --- |
| group by | Groups rows based on unique values in specified columns |
| aggregate | Computes expressions on a group of rows |
| sort | Sorts row(s) or column(s) based on specified conditions. |

The database operation history module 112 is further configured to receive, create, and manage context data relating to extracted data. Context data is information about a table and/or a project that is collected or generated in association with a database operation being performed on the table or project. Context data includes project metadata, table metadata, column metadata, and user metadata. Context data may be stored in the database operation history store 120.

Project metadata fields include:

TABLE 2

Project Metadata Fields

| Metadata Field | Description | Variable Type |
| --- | --- | --- |
| project_id | Project identifier | Alphanumeric/numeric unique identifier |
| project_name | Project name | Text string |
| num_worksheets | Number of tables in project | integer |
| num_join_worksheets | Number of tables joined in the project | integer |
| num_union_worksheets | Number of tables union'ed in the project | integer |
| num_agg_worksheets | Number of aggregate operations performed in the project | integer |

Table metadata fields include:

TABLE 3

Table Metadata Fields

| Metadata Field | Description | Variable Type |
| --- | --- | --- |
| ws_id | Table identifier | Alphanumeric/numeric unique identifier |
| ws_name | Name of table | Text string |
| ws_type | Worksheet type | Type of table based on values |
| ws_rows | Number of rows in table | integer |
| ws_curr_size | Size of table (units?) | integer |
| ws_unique_cols | Number of unique columns in table | integer |
| ws_text_cols | Number of columns containing text | integer |
| ws_date_cols | Number of columns containing dates | integer |
| ws_numeric_cols | Number of columns containing numbers | Whole number |
| ws_blank_cols | Number of blank columns | Whole number |
| ws_hidden_cols | Number of hidden columns | Whole number |
| ws_derived_cols | Number of columns containing derived values | Whole number |
| recipe | Sequence of operations performed on the table | List of text strings |

Column metadata fields include:

TABLE 4

Column Metadata Fields

| Metadata Field | Description | Variable Type |
| --- | --- | --- |
| column_id | Column identifier | Alphanumeric unique identifier |
| column_name | Name of column | Text string |
| column_datatype | Type of data in column | |
| column_nulls | Percentage of null values in column | Decimal |
| column_unique | Percentage of unique values in column | Decimal |
| column_trimmable | Percentage of trimmable values in the column | Decimal |
| column_outlier | Percentage of outlier values in the column | Decimal |
| column_pattern | Pattern of column data | Decimal |
| column_domain | Data domain of the column | Text string |
| column_selection | Column value selected | Text string |
| column_maxvalue | Maximum value in column | Integer |
| column_minvalue | Minimum value in column | Integer |

In one embodiment, context data is contained in a log file that includes project metadata, table metadata, column metadata, user metadata, and operation. Log entries in the log file are generated responsive to a database operation being performed on a table or project, and may be expressed in JavaScript Object Notation (JSON). A log entry expresses context and operation history data in the following format:

{<user metadata><project metadata><worksheet metadata><column metadata><operation specifics>}.

Log entries may be stored in the database operation history store 120. Example log entries are shown below:

Example Log Entry 1:

```
{
"type":
"com.informatica.dataprep.suggestion.logger.ContextCollectorImpl",
"data": {
  "userLogger": {
    "type":
"com.informatica.dataprep.suggestion.logger.UserContextImpl",
    "data": {
      "user_id": 197,
      "licence_plan": "NA"
    }
  },
  "projectLogger": {
    "type":
"com.informatica.dataprep.suggestion.logger.ProjectContextImpl",
    "data": {
      "project_id": 2312,
      "project_name": "test-log",
      "num_worksheets": 1,
      "num_join_worksheets": 0,
      "num_union_worksheets": 0,
      "num_agg_worksheets": 0
    }
  },
  "sheetLogger": [
    {
      "type": "com.informatica.dataprep.suggestion.logger.
      SheetContextImpl",
      "data": {
        "ws_id": 2313,
        "ws_name": "dp_user_session.csv",
        "ws_type": "NORMAL",
        "ws_rows": 31275,
        "ws_curr_size": 6,
        "ws_unique_cols": 3,
```

-continued

```
        "ws_text_cols": 3,
        "ws_date_cols": 0,
        "ws_numeric_cols": 3,
        "ws_blank_cols": 0,
        "ws_hidden_cols": 0,
        "ws_derived_cols": 0,
        "recipe": "deleteHeaderRows;"
      }
    }
  ],
  "columnLogger": [
    {
      "type":
"com.informatica.dataprep.suggestion.logger.ColumnContextImpl",
      "data": {
        "column_id": 2327,
        "column_name": "D",
        "column_datatype": "Integer",
        "column_nulls": 0.0,
        "column_unique": 99.81,
        "column_trimmable": 0.0,
        "column_outlier": 36.17585931254996,
        "column_pattern": "<NUMBER>",
        "column_domain": "None",
        "column_selection": "None",
        "column_maxvalue": "1427703590101",
        "column_minvalue": "1403021779000"
      }
    }
  ],
"operationLogger": {
    "type":
"com.informatica.dataprep.suggestion.logger.OperationContextImpl",
    "data": {
      "operation": "expr:",
      "operation_description":
      "expr:(((C3/60)/60)/24000)+DATE(1970,1,1)"
    }
  },
  "timestamp": 1427863549753
}
}
```

In the first example log entry, user metadata is contained in the "userLogger" section. The "type" subsection in this section indicates that the data is user metadata (" . . . UserContextImpl"). The "data" subsection in this section includes a user identifier value ("user_id": 197), which uniquely identifies the user of the data analysis application 125 when the database operation was performed.

Project metadata is contained in the "projectLogger" section. The "type" subsection in this section indicates that the data is project context data (" . . . ProjectContextImpl"). The "data" subsection includes characteristics of the project in which the database operation was performed, including a project identifier ("project_id": 2312), project name ("project_name": "test-log"), a number of tables in the project ("num_worksheets": 1), a number of joined worksheets ("num_join_worksheets": 0), a number of union worksheets ("num_union_worksheets": 0), and a number of aggregate worksheets ("num_agg_worksheets": 0).

Table metadata is contained in the "sheetLogger" section. The "type" subsection in this section indicates that the data is table metadata (" . . . SheetContextImpl"). The "data" subsection includes characteristics of the table on which the database operation was performed, including a table identifier ("ws_id": 2313), table name ("ws_name": "dp_user_session.csv"), a table type ("ws_type": "NORMAL"), a number of rows in the table ("ws_rows": 31275), a table size ("ws_curr_size": 6), a number of unique columns in the table ("ws_unique_cols": 3), a number of text columns in the table ("ws_text_cols": 3), a number of columns in date format ("ws_date_cols": 0), a number of numeric columns ("ws_numeric_cols": 3), a number of blank columns ("ws_blank_cols": 0), a number of hidden columns ("ws_hidden_cols": 0), a number of derived columns ("ws_derived_cols": 0), and a list of operations performed on the table ("recipe": "deleteHeaderRows;").

Column metadata is contained in the "columnLogger" section. The "type" subsection in this section indicates that the data is column metadata (". . . ColumnContextImpl"). The "data" subsection includes characteristics of a column on which the database operation was performed, including a column identifier ("column_id": 2327), a column name ("column_name": "D"), a column data type ("column_datatype": "Integer"), a percentage of null values in the column ("column_nulls": 0.0), a percentage of unique values in the column ("column_unique": 99.81), a percentage of trimmable values in the column ("column_trimmable": 0.0), a percentage of outliers in the column ("column_outlier": 36.17585931254996), a pattern of the column values ("column_pattern": "<NUMBER>"), a domain of the column ("column_domain": "None"), a selected region of the column ("column_selection": "None"), a maximum value of the column ("column_maxvalue": "1427703590101"), and a minimum value of the column ("column_minvalue": "1403021779000").

Database operation history data is contained in the "operationLogger" section. The "type" subsection in this section indicates that the data is operation history data (". . . OperationContextImpl"). The "data" subsection in this section includes an operation identifier that identifies which database operation was performed ("operation": "expr:"), and an operation description, which indicates operands that were included with the database operation ("operation_description": "expr (((C3/60)/60)/24000)+DATE(1970,1,1)") The "expr" operation, evaluates a mathematical expression. In this example, the operation is used to convert a timestamp milliseconds into a number of days, and adds them to the date 1/1/1970 to get the date of the timestamp.

Example Log Entry 2:

```
{
  "type":
"com.informatica.dataprep.suggestion.logger.ContextCollectorImpl",
  "data": {
    "userLogger": {
      "type":
"com.informatica.dataprep.suggestion.logger.UserContextImpl",
      "data": {
        "user_id": 352,
        "licence_plan": "NA"
      }
    },
    "projectLogger": {
      "type":
"com.informatica.dataprep.suggestion.logger.ProjectContextImpl",
      "data": {
        "project_id": 688,
        "project_name": "DP Tables",
        "num_worksheets": 2,
        "num_join_worksheets": 0,
        "num_union_worksheets": 0,
        "num_agg_worksheets": 0
      }
    },
    "sheetLogger": [
      {
        "type": "com.informatica.dataprep.suggestion.logger.
SheetContextImpl",
        "data": {
          "ws_id": 762,
          "ws_name": "dp_user.csv",
          "ws_type": "NORMAL",
          "ws_rows": 5420,
          "ws_curr_size": 7,
          "ws_unique_cols": 2,
          "ws_text_cols": 6,
          "ws_date_cols": 0,
          "ws_numeric_cols": 1,
          "ws_blank_cols": 0,
          "ws_hidden_cols": 0,
          "ws_derived_cols": 0,
          "recipe": "deleteHeaderRows;upper;"
        }
      },
      {
        "type": "com.informatica.dataprep.suggestion.logger.
SheetContextImpl",
        "data": {
          "ws_id": 689,
          "ws_name": "dp_user_session.csv",
          "ws_type": "NORMAL",
          "ws_rows": 31275,
          "ws_curr_size": 8,
          "ws_unique_cols": 3,
          "ws_text_cols": 3,
          "ws_date_cols": 1,
          "ws_numeric_cols": 3,
          "ws_blank_cols": 1,
          "ws_hidden_cols": 0,
          "ws_derived_cols": 0,
          "recipe": "deleteHeaderRows;expr
(((C3/60)/60)/24000)+DATE(1970,1,1);expr;"
        }
      }
    ],
    "columnLogger": [
      {
        "type":
"com.informatica.dataprep.suggestion.logger.ColumnContextImpl",
        "data": {
          "column_id": 802,
          "column_id": 802,
          "column_name": "id",
          "column_datatype": "Integer",
          "column_nulls": 0.0,
          "column_unique": 100.0,
          "column_trimmable": 0.0,
          "column_outlier": 35.283262594574644,
          "column_pattern": "<NUMBER>",
          "column_domain": "None",
          "column_selection": "None",
          "column_maxvalue": "5947716",
          "column_minvalue": "22"
        }
      },
      {
        "type":
"com.informatica.dataprep.suggestion.logger.ColumnContextImpl",
        "data": {
          "column_id": 794,
          "column_name": "USER_ID",
          "column_datatype": "Integer",
          "column_nulls": 0.0,
          "column_unique": 11.55,
          "column_trimmable": 0.0,
          "column_outlier": 11.210590266675194,
          "column_pattern": "<NUMBER>",
          "column_domain": "None",
          "column_selection": "None",
          "column_maxvalue": "5947257",
          "column_minvalue": "22"
        }
      }
    ],
    "operationLogger": {
      "type":
"com.informatica.dataprep.suggestion.logger.OperationContextImpl",
      "data": {
        "operation": "Join",
        "operation_description": "Join:762 FULL_OUTER 689"
```

```
    }
  },
  "timestamp": 1427888644562
  }
}
```

Example log entry 1 corresponds to a database operation that was performed on one table. Example log entry 2 corresponds to a database operation that was performed on two tables. Database operations performed on two tables include join and union operations, which combine columns from two tables. In the example log entry 2, a full outer join operation was performed on tables with the table IDs 762 and 689, as specified in the SheetLogger section. Example log entry 2 has two sets of table data and two sets of column data, with each set corresponding to one of the two tables on which the join operation was performed.

A user module 115 of the data analysis server 104 allows users to manage accounts with the data analysis server 104. The user module 115 further receives and stores user information corresponding to user activities related to the data analysis application 125. User information may include user preferences, information about computing devices associated with the user, users' associations with various groups (e.g., enterprises, organizations, etc.), and users' status as training users and/or guided users. Training users are users of the data analysis application 125 whose database operations are used to train a predictive model for recommending database operations to guided users. Guided users are users of the data analysis application 125 who receive recommendations for database operations from the trained predictive model. One or more sets of guided users may be associated with one or more sets of training users such that recommendations for the guided users are generated using data associated with the training users.

A user's status as a guided user and/or a training user, as well as associations between sets of guided users and training users, may be designated by a system administrator, other users, or automatically. For example, a group (e.g., organization or enterprise) may designate advanced users of the data analysis application 125 as training users, and less-experienced users as guided users. Sets of training users may also be determined automatically by the user module 115 based on user characteristics, such as geographical region or measures of proficiency with the data analysis application 125. The guided users may be associated with the training users such that training data associated with the training users is used to generate recommendations for the guided users. As a result the knowledge and experience of the training users may be leveraged by the data analysis server 104 to provide helpful recommendations to the guided users. Associating a set of training users from a group with a set of guided users from the same group allows the system to provide users with recommendations that are specifically relevant to that group, and can allow users in the group to increase productivity while maintaining consistency across the group and protecting proprietary information (e.g., equations, functions, and data).

In one embodiment, there are multiple sets of training users and guided users. A particular user may simultaneously be a training user and a guided user, and may belong to multiple sets of training users and/or guided users. A user may be a training user with respect to one type of project (e.g., accounting), but a guided user with respect to another type of project (e.g., marketing). A user's status as a training user and/or a guided user as well as any associations between training users and guided users may be stored in the user data store 117. The user module 115 may determine, for a particular project, a user's status as either a guided user or a training user. If the user is a guided user, the user module 115 may additionally determine which set or sets of training users should be used to generate recommendations.

The database operation recommendation module 114 determines recommended database operations for users based on context data and database operation history data. The database operation recommendation module 114 recommends database operations based on a predictive model. Database operations include operands that are also determined by a predictive model. Operands are inputs or parameters for database operations, such as function inputs. In various embodiments, the predictive model or models are machine learning algorithms that may be trained by using database operation history data and context data. Various predictive models are well known in the art, including logistic regression, neural networks, decision tree models, and support vector machine models. The models predict the probability that a particular database operation is appropriate given a particular set of inputs (e.g., context data), and recommend one or more of probable database operations, and optionally, operands corresponding to recommended operations. The predictive models may be machine learning algorithms that are trained using database operation history data and context data. In one embodiment, a discriminative model is used such as a multinomial logistic classifier or other suitable general-purpose machine learning technique. Equations, parameters, and other model characteristics may be stored in the database operation recommendation store 121. Three example models for generating database operation recommendations are discussed below with respect to FIG. 2.

Figure 2:
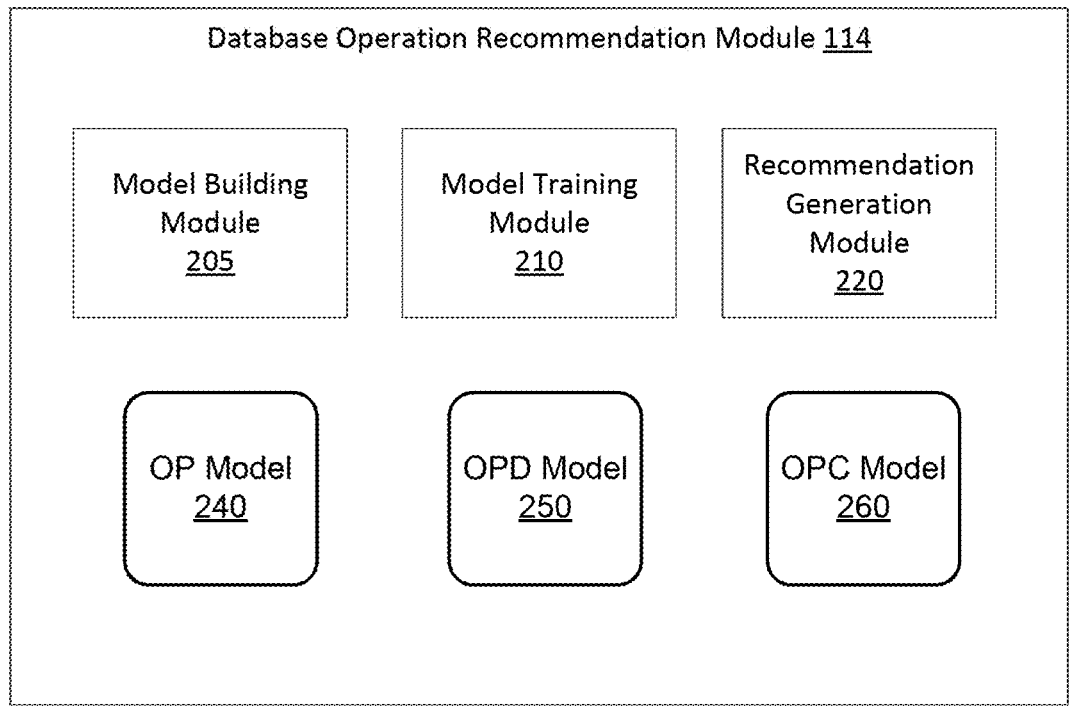
FIG. 2 shows a more detailed view of the database operation recommendation module according to one embodiment.

FIG. 2 shows a more detailed view of the database operation recommendation module 114 according to one embodiment. A model building module 205 builds predictive models, a model training module 210 trains predictive models using training data from training users, and a recommendation generation module 220 uses the trained predictive models to determine database operations for recommendation to guided users. In one embodiment, the models use a multinomial logistical classifier. Given particular context data as represented by the metadata fields profiled from the log entries, the models that use the multinomial logistical classifier generate a list of database operations with respective probabilities. The models are trained using training data. In one embodiment, the training data includes stored database operation history data and context data for the set of training users. In this embodiment, the model training module 210 determines the training users for a model, for example from the user data store 117, and retrieves the training data from the database operation history store 120.

The model building module 205 builds predictive models, and is one means for performing this function. A multinomial logistic classifier provides an estimate for the probability of an event occurring based on given information. A multinomial logistic classifier takes the following form:

$$P(c \mid d) = \frac{\exp\left(\sum_t (\lambda_{t,c} F_{t,c}(d, c))\right)}{\sum_{c'} \exp\left(\sum_t (\lambda_{t,c'} F_{t,c'}(d, c'))\right)}$$

Where P(c|d) is an estimate of the probability of an event characterized by class c occurring given conditions d characterized by features F. The class c corresponds to the output of the particular predictive model, either an operation or operand, and the features F correspond to the associated context data. $F_i(d,c)$ is a measure of observation of a feature i, where a higher F value indicates a higher relative measure of the presence of the feature. $\lambda_{i,c}$ is a feature weight for the feature i corresponding to the class c. A high $\lambda_{i,c}$ for a particular feature indicates that the F value is a strong indicator for the class c. A feature may have a different F value or $\lambda$ value for different classes c. The probability expressed by P(c|d) is computed by determining, for a class c, the exponential of the sum of the product of the measure of observation and the feature weight across all features for a class, and dividing that value by the sum of the same value across all classes.

In one embodiment, the model building module 205 builds three models: an operation model (OP Model), an operand model (OPD Model), and a column operation model (OPC Model). Each of the three models is trained by the model training module 210 using training data from training users. Each of the three models is used by the recommendation generation module 220 to generate lists of recommended database operations and/or operands and associated relative probabilities based on context data.

The OP Model generates lists and associated probabilities for recommended database operations for single-table database operations. The features for the OP Model are column metadata fields.

The OPD Model generates lists and associated probabilities for operands for recommended database operations for single-table database operations. The features for the OPD Model are column metadata fields and database operations. In one embodiment, the OPD Model is used in conjunction with the OP Model to determine operands for database operations determined by the OP Model. The OPD Model takes the database operations determined by the OP Model as inputs such that the recommended operands determined by the OPD Model correspond to the determined operations.

The OPC Model generates lists and associated probabilities for recommended database operations for two-table database operations. The features for the OPC Model are metadata for the each of the two tables and for each of the two columns.

TABLE 5

Model Classes and Features

| Model | Classes | Features |
|---|---|---|
| OP | Database Operations | Column Metadata |
| OPD | Operands | Column Metadata, Database Operations |
| OPC | Join, Union | Table metadata, column metadata |

For each model, the model training module 210 determines which context data fields are selected as features to include in the multinomial logistic classifier. The model training module 210 further determines the feature weights for each selected feature. Not all metadata fields are predictive of operations and/or operands, so not all metadata fields are used as features in the model. In one embodiment, the model training module 210 selects context data fields to use as model features that, across multiple database operation history entries, are predictive of a particular database operation being taken or operand being used. The model training module 210 calculates a measure of predictiveness for each context data field; the measure of predictiveness may be information gain, for example. For each class, the model training module 210 computes the information gain for each feature in the list of possible features based on stored context data. The model training module 210 selects features that are beyond a threshold information gain value to include in the model. For a given class, information gain for a feature may be calculated by the following equation:

$$IG(C|F) = \text{Entropy}(C) - \text{Entropy}(C|F)$$

Where IG(C|F) is the information gain, Entropy(C) is the entropy of class C and Entropy(C|F) is the conditional entropy of class C given the presence of a feature.

In one embodiment, the model training module 210 preprocesses context data prior to calculating information gain. In one embodiment, the model training module 210 resamples context data to make the distribution of data entries more uniform across each class, so that less frequent database operations are not underrepresented in the model. Resampling techniques may include undersampling methods, oversampling methods, or hybrid methods. In one embodiment, resampling is performed using the Synthetic Minority Oversampling Technique (SMOTE). In various embodiments, other preprocessing steps are performed on the context data, such as converting all data to numeric representation, normalization of data, and quantization of numerical values into bins.

FIG. 3 is an example table of data entries illustrating features and classes for use in training a predictive model such as the OP Model. In the example of FIG. 3, the features, shown in columns 301-308, are a selected set of column metadata entries corresponding to columns upon which database operations were performed.

Column 301 contains values from the "column_id" metadata field identified in Table 4.

Column 302 contains values from the "column_type" metadata field identified in Table 4.

Column 303 contains values from the "column_nulls" metadata field identified in Table 4.

Column 304 contains values from the "column_unique" metadata field identified in Table 4.

Column 305 contains values from the "column_pattern" metadata field identified in Table 4.

Column 306 contains values from the "column_domain" metadata field identified in Table 4.

Column 307 contains values from the "column_maxvalue" metadata field identified in Table 4.

Column 308 contains values from the "column_minvalue" metadata field identified in Table 4.

The classes for the model here are names of database operations that were performed on the columns, as identified in Table 1, shown in column 310. As shown in Table 5, these particular example features and classes would be used to train the OP Model. The example of FIG. 3 shows 14 data entries but in practice, the predictive models described above may be trained using hundreds, thousands, millions or more data entries. In various embodiments, the pieces of context data and database operation history data that make up the data entries are selected from log entries by the model training module 210 as described above with respect to FIG. 2. Data entries may be stored in the database operation recommendation store 121.

A recommendation generation module 220 uses the trained predictive models to determine a list of database operations and/or operands for recommendation to guided users along with relative probabilities for each. The recommendation generation module 220 receives context data, for example in the form of a log file. The recommendation generation module 220 profiles the log file to capture the relevant context data in a format that may be input to the predictive models. The recommendation generation module 220 inputs the context data to the appropriate predictive models, to generate recommendations. In various embodiments, the predictive models used are the OP model and OPD model in the case of single table recommendations, or the OPC model in the case of multi-table recommendations. The recommendation generation module 220 may generate recommendations upon the happening of various events, at regular intervals, or at any other suitable time. In one embodiment, the recommendation generation module 220, executes program code that detects selection of a column in the user interface of the data analysis application 125 and generates recommendations for that column in response. A process for generating such a recommendation is discussed below with respect to FIG. 5.

The recommendation generation module 220 selects one or more recommended database operations and/or operands from the generated list or lists. In one embodiment, the recommendation generation module 220 selects recommendations with the highest relative probabilities, as calculated by the predictive models. For example, for a single-sheet recommendation for a selected column, the recommendation generation module 220 may select the three most probable database operations as determined by the OP Model, and the one most probable operand for each operation as determined by the OPD Model.

The recommendation generation module 220 provides recommendations to the data analysis application 125 for display to the user. In one embodiment, recommendations are provided as a textual description of the operation. Textual descriptions for each database operations may be stored in the database operation recommendation store 121. The recommendation generation module 220 may retrieve textual descriptions for recommended database operations to provide to the data analysis application 125 for display to the user.

Figure 4:
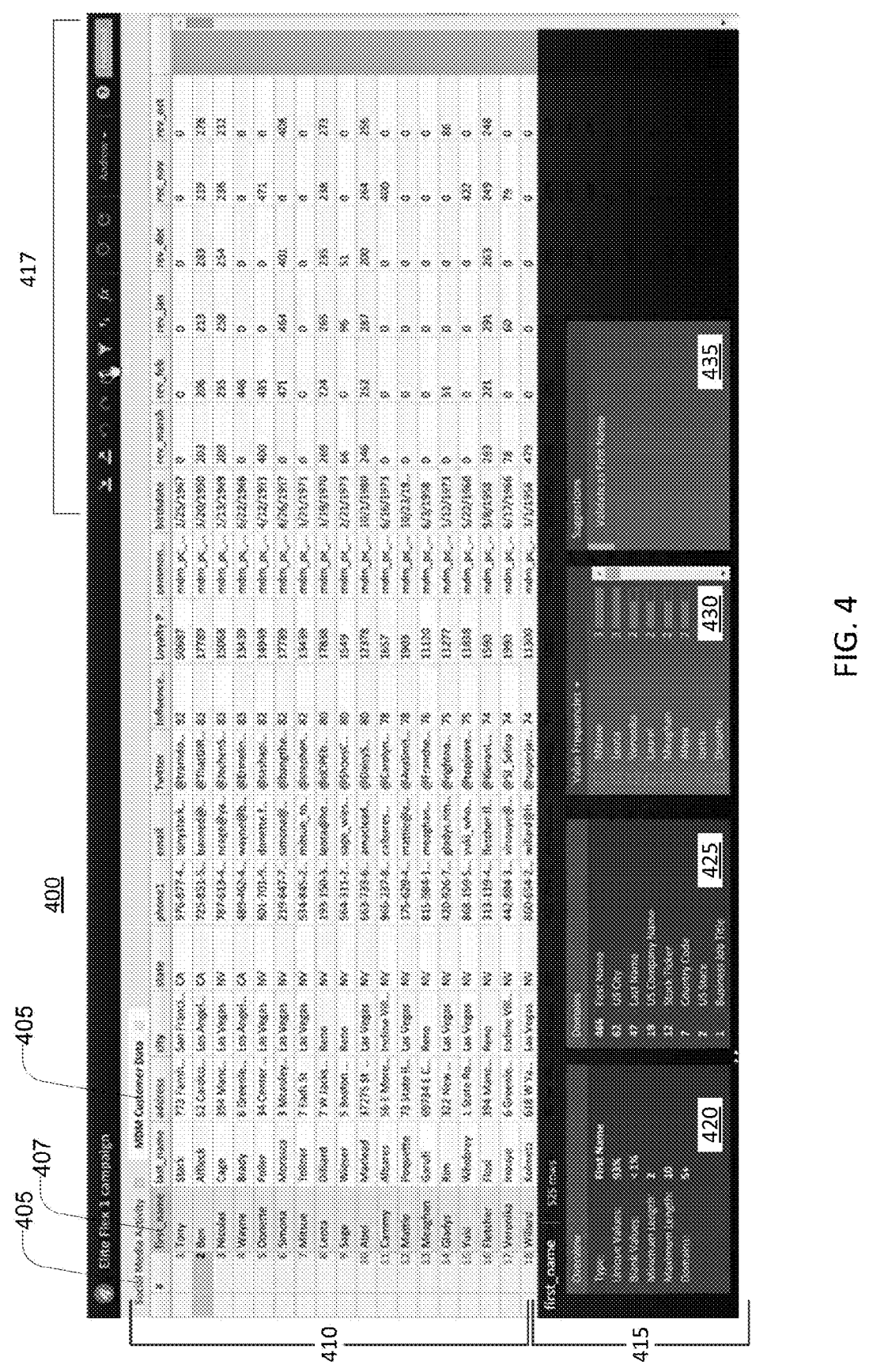

FIG. 4 illustrates an example of a user interface 400 for viewing and manipulating data in a data analysis application according to one embodiment. The example user interface includes a data section 410, an information section 415, and controls 417.

The data section 410 displays tables for viewing and manipulation. The data section 410 is populated with data extracted from one or more data sources, e.g., 102. In this example, two table tabs 405 are shown, and the table titled "MDM Customer Data" is displayed in the data section 410. The user may navigate to other tables in the project using the table tabs 405. In the example of FIG. 4, the column "first name" 407 is selected.

The information section 415 displays profiled information about the tables and selected data. In the information section 415, an overview card 420 provides an information overview for the selected column (first name), such as the type, percentage of unique values, percentage of blank values, minimum length for names in the column, maximum length for names in the column, and number of domains. A domains card 425 includes information about all of the domains in the table 405, and how many rows correspond to each domain. λ value frequencies card 430 lists the frequencies of the values of the various names in the selected first name column 407, as well as how name times each of the names occurs.

A suggestions card 435 provides the user with suggestions for performing recommended database operations determined by the database operation recommendation module 114. In the example shown, the suggested database operation is verify as first name. The system uses the data profiling described above to help provide these intelligent suggestions to the user of the interface. The suggestions card 435 is discussed in more detail below with respect to FIGS. 5 and 6.

The controls 317 allow a user to manipulate displayed data and tables, including performing database operations on the data and tables. Data and tables may also be manipulated in other ways such as interacting with data entries (editing cell contents, right clicking a cell, inserting equations, etc.) or interacting with elements in the information section such as the suggestions card 335.

Figure 5A:
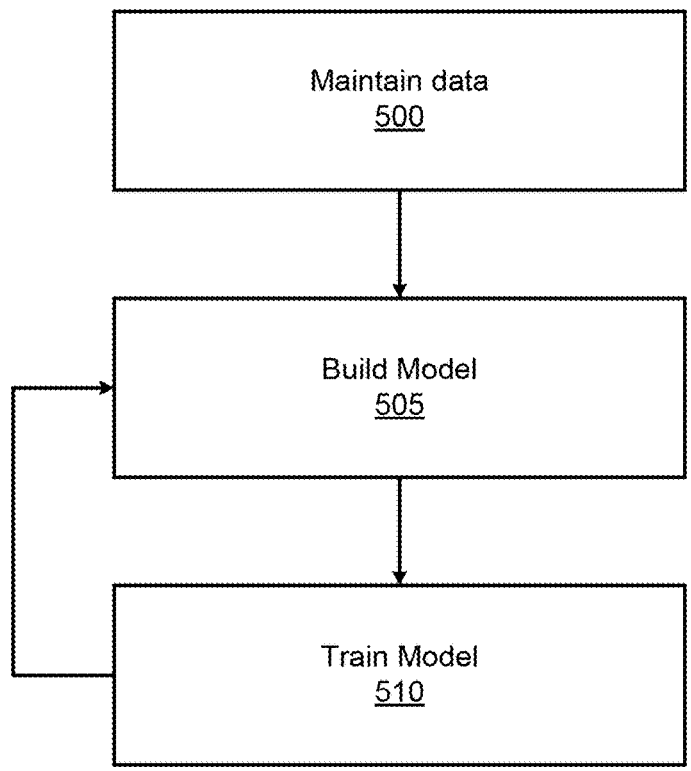
FIG. 5A is a flowchart illustrating a method for building and training a predictive model for determining and recommending database operations to a guided user of a data analysis application according to one embodiment.

FIG. 5A is a flowchart illustrating a method for building and training a predictive model for determining and recommending database operations to a guided user of a data analysis application according to one embodiment. The data analysis server 104 maintains 500 context data and database operation history data for training users of the data analysis application 125. The data analysis server 104 maintains context data and database operation history data by receiving and storing, over a period of time, context data and database operation history data from instances of the data analysis application 125, for example as log files as discussed above with respect to FIG. 1. In one embodiment, the data analysis application 125 sends a log file to the database operation history module 112 upon detecting a database operation. In another embodiment, the database operation history module 112 monitors the data analysis application 125 on an ongoing basis and receives and stores database operation history data and corresponding context data upon detecting a database operation.

As discussed above with respect to FIG. 1, a user's status as a guided user and/or a training user, as well as associations between sets of guided users and training users, may be designated by a system administrator, other users, or automatically.

In steps 505 and 510, one or more predictive models are built and trained for use in providing recommendations to guided users. The database operation recommendation module 114 builds 505 a predictive model. The predictive model can be the operation model (OP), the operand model (OPD), or the column operation model (OPC), or any combination thereof. Building the predictive model includes determining the training users whose database operations will be used as the training data for the model. Building the predictive model further includes determining model classes. For example, if the predictive model is the OP Model, the classes are database operations. If the predictive model is the OPD model, the classes are operands. If the predictive model is the OPC model, the classes are join and union operations, or defined two-table operations. Building the predictive model further includes determining possible model features, as described with respect to Table 5 above. Building the predictive model further includes retrieving model equations from the database operation recommendation store 121. At the conclusion of step 505, the model exists in its untrained form. The equations discussed with respect to FIG. 2 are assembled for each class, but the feature weights are unknown or set to default values. In this form, the model is ready for training with the appropriate context data corresponding to the determined training users.

The model training module 210 trains 510 the model using the maintained database operation history data and context data from the determined training users. The model training module 210 retrieves the database operation history data and training context data corresponding to the training users from the profiling data store 118 and the database operation history store 120. As discussed above with respect to FIG. 2, the model training module 210 determines what context data is predictive of a particular database operation or operand. The model training module 210 determines feature weights for each model feature, as described above with respect to FIG. 2. Feature weights and other parameters may be stored in the database operation recommendation store 121 and retrieved for use as necessary. In one embodiment, the model training module 210 preprocesses the context data prior to training the model, as discussed above with respect to FIG. 2. Once a model is trained, it may be used to determine the probability of classes (operations or operands) based on a set of features (context data received from the data analysis application).

Steps 505 and 510 may occur at regular intervals, on an ongoing basis, or depending on factors such as how much new training data is available. Steps 505 and 510 may be repeated for each predictive model that is generated by the database operation recommendation module 114. As discussed above with respect to FIG. 2, the OPD Model may be used in conjunction with the OP Model to determine operands for database operations determined by the OP Model. The OPD Model may take the database operations determined by the OP Model as inputs such that the recommended operands determined by the OPD Model correspond to the determined operations.

Figure 5B:
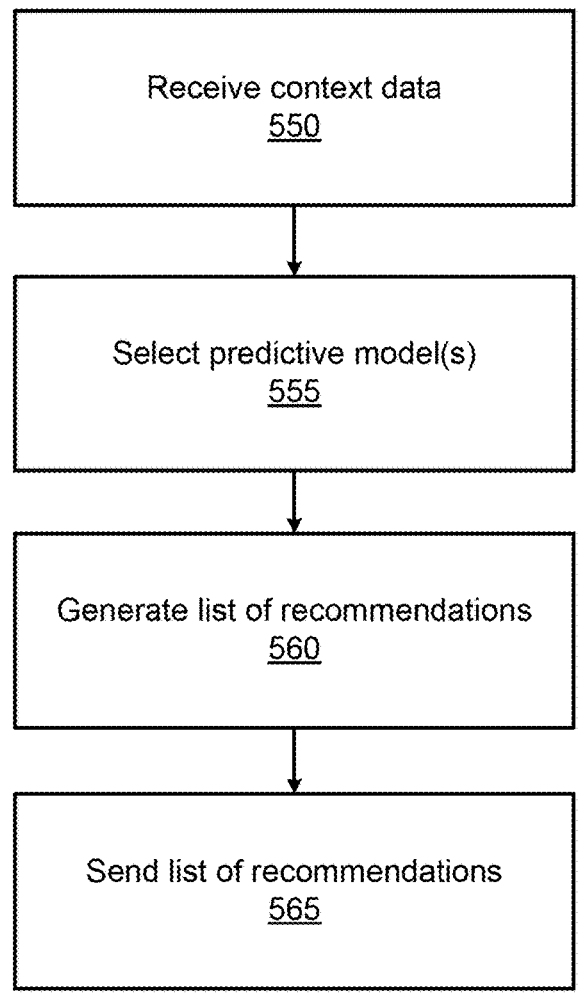
FIG. 5B is a flowchart illustrating a method for using a trained predictive model to recommend database operations to a guided user of a data analysis application according to one embodiment.

FIG. 5B is a flowchart illustrating a method for using a trained predictive model to recommend database operations to a guided user of a data analysis application according to one embodiment. The recommendation generation module 220 receives 550 application context data from the data analysis application 125 of a guided user. In one embodiment, the application context data is received responsive to a detected interaction with the data analysis application 125 such as a column being selected in a table displayed in the data analysis application. The data analysis application 125 detects the interaction, creates an application log entry containing the context data and sends the application log entry to the data analysis server 104. In one embodiment, the recommendation generation module 220 profiles the application log entry to capture context data in a format that can be used as an input to the trained predictive models.

The recommendation generation module 220 selects 555, based on the context data, one or more models to use to generate recommendations. For example, if the context data indicates that the project has one table, the recommendation generation module 220 uses the OP Model and the OPD Model to generate recommendations. If the context data indicates that the project has more than one table, the recommendation generation module 220 uses the OP Model, the OPD Model, and the OPC Model to generate recommendations. As discussed above with respect to FIGS. 2 and 5A, the OPD Model may use the outputs of the OP Model as inputs to determine operands that correspond to the list of recommended operations determined by the OP Model.

The recommendation generation module 220 uses the selected predictive models and the received context data to generate 560 a list of database operations and/or operands for recommendation to the guided user. In various embodiments, the generated list of recommendations includes operations and operands determined by one or more of the OP Model, the OPD Model, and the OPC Model, and other predictive models. The recommendation generation module 220 uses each model selected in step 555 to determine a probability associated with each model class. The generated list of recommendations is based on the determined probabilities. For example, if the OP Model or OPC Model is used, the recommendation generation module 220 selects a number of the most probable database operations as determined by the model to provide as recommendations to the guided user. If the OPD Model is also used, the selected database operations determined by the OP Model are used as inputs to the OPD Model to determine a number of the most probable operands for the selected database operations.

The recommendation generation module 220 sends 535 the list of recommendations to the data analysis application 125 for presentation to the guided user. In one embodiment, each recommended database operation includes an operation identifier that uniquely identifies the database operation the data analysis application 125. In another embodiment, each recommended database operation further includes a textual name or description of the database operation for presentation to the user of the data analysis application 125. Database operations, operation identifiers, and textual names and descriptions may be stored in the database operation recommendation store 121 and retrieved by the database operation recommendation module 114 prior to sending recommended database operations to the data analysis application 125.

Figure 6:
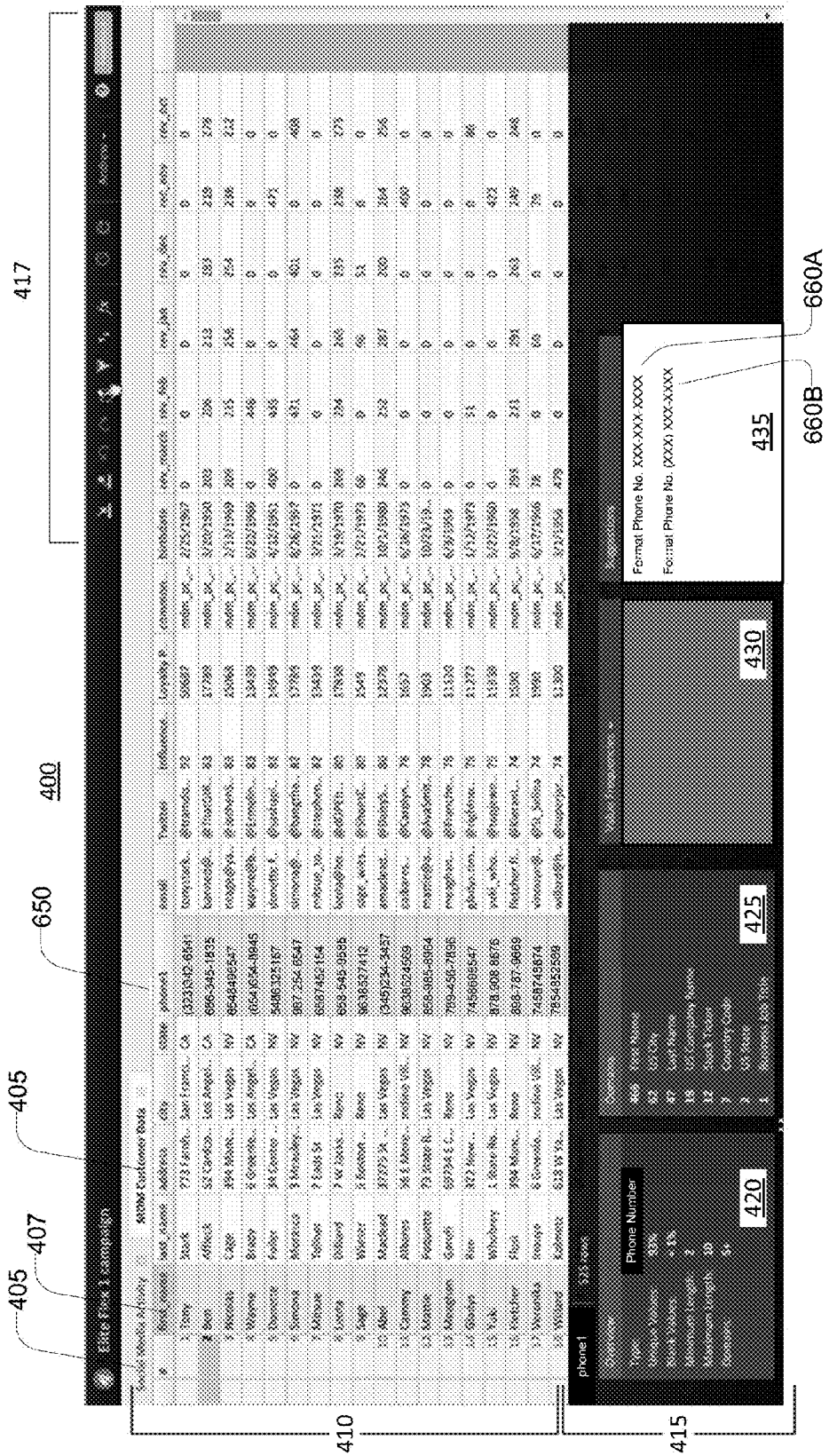
FIG. 6 illustrates the example user interface of FIG. 3 with recommendations provided responsive to a selected column, according to one embodiment.

FIG. 6 illustrates the example user interface of FIG. 3 with recommendations provided responsive to a selected column, according to one embodiment. In the example user interface, column 650 is selected, for example responsive to a user input. The data analysis application 125 detects the column selection and notifies the data analysis server 104. The data analysis server 104 receives context data from the data analysis application 125 responsive to the selection of the column 650. In one embodiment, the database operation recommendation module 114 determines the user's status as a guided user for the particular project from the user data store 117, and passes the context data to the OP Model (since a single column is selected) and OPC model. The OP Model outputs the list of operations, and the OPC Model outputs one or more operands. The database operation recommendation module 114 determines recommended database operations, and operands if appropriate, and sends the recommendations to the data analysis application 125. In the example of FIG. 6, the user has selected a column appearing to contain phone numbers formatted in different ways. Accordingly, the two recommendations provided include an operation of formatting the phone numbers determined by the OP Model, and operands of the specific type of formatting to apply determined by the OPD Model.

Figure 7:
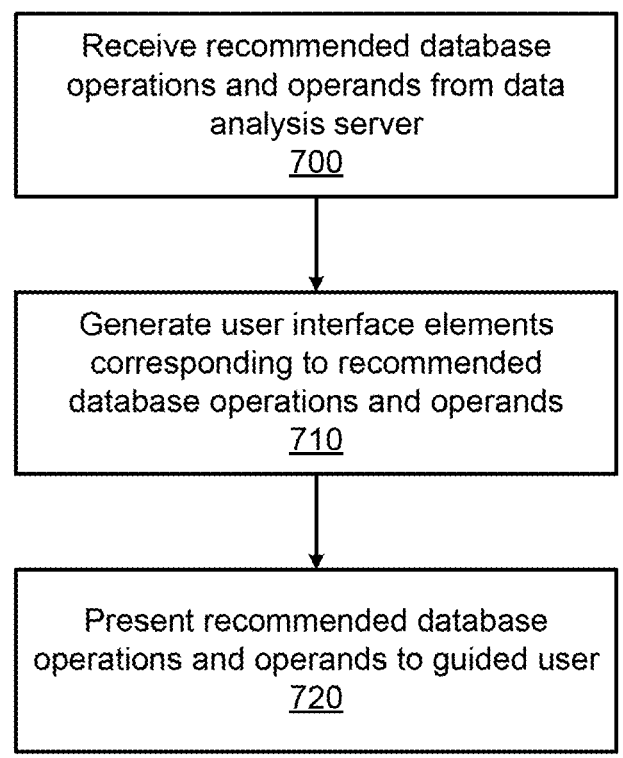
FIG. 7 is a flowchart illustrating a method for presenting, in a data analysis application, recommended database operations and operands received from a data analysis server.

FIG. 7 is a flowchart illustrating a method for presenting, in a data analysis application, recommended database operations and operands received from a data analysis server. The data analysis application 125 receives 700 recommended database operations and operands from the data analysis server 104. As discussed above with respect to FIG. 5, the database operations may include a textual name or description for presentation in the user interface of the data analysis application 125. The UI module 122 generates 710 user interface elements corresponding to the recommended database operations and operands using the textual names and descriptions provided by the data analysis server 104. The UI module 122 presents 720, via the user interface of the data analysis application 125, one or more recommended database operations to the user of the data analysis application.

Returning to FIG. 6, suggestions card 435 includes recommended database operations. The column 650 contains phone numbers that are formatted in different ways. The recommendations 660A-C on the suggestions card 435 include formatting the phone number in the cell or column. The recommendations 650A and B have a common database operation (formatting the phone number), but different operands (the output format of the phone number). The user of the data analysis application may select one of the recommendations 660A-C to perform the indicated database operation on the data.

Additional Configuration Considerations

The system described herein may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of the system as described herein can be controlled through a combination of hardware and computer programs installed in computer storage and executed by the processors of such servers to perform the functions described herein. The system 100 includes other hardware elements necessary for the operations described here, including network interfaces and protocols, input devices for data entry, and output devices for display, printing, or other presentations of data, but which are not shown here in order to avoid obscuring the relevant details of the embodiments.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein, the term "module" refers to computer program logic utilized to provide the specified functionality. Thus, a module can be implemented in hardware, firmware, and/or software. In one embodiment, program modules are stored on a storage device, loaded into memory, and executed by a processor. Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining similarity of entities across identifier spaces. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method executed by one or more computing devices for providing recommendations to a user of an instance of a data analysis application, the method comprising:

profiling, by at least one of the one or more computing devices, context data by capturing database operation history data entries and training context data entries from the context data, the context data comprising entries received from one or more instances of the data analysis application responsive to database operations being performed on tables in the data analysis application;

maintaining, by at least one of the one or more computing devices, for a first set of users, profiled database operation history data and profiled context data for a plurality of database operations performed on a plurality of tables;

generating, by at least one of the one or more computing devices, a plurality of predictive models configured to recommend one or more of: at least one database operation or at least one operand to a second set of users of the data analysis application, each predictive model including a plurality of features corresponding to context data fields from the profiled context data and either a plurality of corresponding to database operations or a plurality of operands for recommendation;

receiving an application log entry comprising application context data, the application log entry received responsive to a user of the second set of users selecting a column in a table in the instance of the data analysis application;

selecting, by at least one of the one or more computing devices, one or more predictive models in the plurality of predictive models based at least in part on the application context data;

generating, by at least one of the one or more computing devices, one or more lists of probabilities by inputting the application context data into the one or more selected predictive models, wherein each list of probabilities comprises a plurality of probability values associated with the plurality of database operations or the plurality of operands;

determining, by at least one of the one or more computing devices, one or more recommendations based at least in part on the one or more lists of probabilities, each recommendation in the one or more recommendations comprising a database operation or an operand; and transmitting, by at least one of the one or more computing devices, the one or more recommendations to the instance of the data analysis application for presentation to the user.

2. The method of claim 1, wherein generating the plurality of predictive models comprises, for each predictive model:
determining the plurality of features by selecting the plurality of context data fields from the profiled context data;
determining the plurality of database operations or the plurality of operands for recommendation; and
determining, for each of the plurality of database operations or the plurality of operands, a feature weight for each of the plurality of features, the feature weight corresponding to a measure of predictiveness of the feature with respect to the database operation or operand.

3. The method of claim 1, wherein the training context data comprises at least one of project metadata, worksheet metadata, and user metadata.

4. The method of claim 1, wherein at least one predictive model is a multinomial logistic classifier.

5. The method of claim 1, wherein the application context data comprises at least one of project metadata, worksheet metadata, and user metadata.

6. The method of claim 1, wherein the one or more recommendations comprise at least one of a join operation and a union operation.

7. The method of claim 1, wherein the one or more selected predictive models comprise an operation model and an operand model and wherein generating one or more lists of probabilities by inputting the application context data into the one or more selected predictive models comprises:
generating a first list of probabilities by inputting the application context data into the operation model, the first list of probabilities comprising probabilities associated with the plurality of operations; and
generating a second list of probabilities by inputting the application context data and the first list of probabilities into the operand model, the second list of probabilities comprising probabilities associated with the plurality of operands.

8. An apparatus for providing recommendations to a user of an instance of a data analysis application, the apparatus comprising:
one or more processors; and
one or more memories operatively coupled to at least one of the one or more processors and having instructions stored thereon that, when executed by at least one of the one or more processors, cause at least one of the one or more processors to:
profile context data by capturing database operation history data entries and training context data entries from the context data, the context data comprising entries received from one or more instances of the data analysis application responsive to database operations being performed on tables in the data analysis application;
maintain, for a first set of users, profiled database operation history data and profiled context data for a plurality of database operations performed on a plurality of tables;
generate a plurality of predictive models configured to recommend one or more of: at least one database operation or at least one operand to a second set of users of the data analysis application, each predictive model including a plurality of features corresponding to context data fields from the profiled context data and either a plurality of corresponding database operations or a plurality of operands for recommendation;
receiving an application log entry comprising application context data, the application log entry received responsive to a user of the second set of users selecting a column in a table in the instance of the data analysis application;
select one or more predictive models in the plurality of predictive models based at least in part on the application context data;
generate one or more lists of probabilities by inputting the application context data into the one or more selected predictive models, wherein each list of probabilities comprises a plurality of probability values associated with the plurality of database operations or the plurality of operands;
determine one or more recommendations based at least in part on the one or more lists of probabilities, each recommendation in the one or more recommendations comprising a database operation or an operand; and
transmit the one or more recommendations to the instance of the data analysis application for presentation to the user.

9. The apparatus of claim 8, wherein the instructions that, when executed by at least one of the one or more processors, cause at least one of the one or more processors to generate the plurality of predictive models further cause at least one of the one or more processors to, for each predictive model:
determine the plurality of features by selecting the plurality of context data fields from the profiled context data;
determine the plurality of database operations or the plurality of operands for recommendation; and
determine, for each of the plurality of database operations or the plurality of operands, a feature weight for each of the plurality of features, the feature weight corresponding to a measure of predictiveness of the feature with respect to the database operation or operand.

10. The apparatus of claim 8, wherein the training context data comprises at least one of project metadata, worksheet metadata, and user metadata.

11. The apparatus of claim 8, wherein at least one predictive model is a multinomial logistic classifier.

12. The apparatus of claim 8, wherein the application context data comprises at least one of project metadata, worksheet metadata, and user metadata.

13. The apparatus of claim 8, wherein the one or more recommendations comprise at least one of a join operation and a union operation.

14. The apparatus of claim 8, wherein the one or more selected predictive models comprise an operation model and an operand model and wherein the instructions that, when executed by at least one of the one or more processors, cause at least one of the one or more processors to generate one or more lists of probabilities by inputting the application context data into the one or more selected predictive models further cause at least one of the one or more processors to:
generate a first list of probabilities by inputting the application context data into the operation model, the first list of probabilities comprising probabilities associated with the plurality of operations; and
generate a second list of probabilities by inputting the application context data and the first list of probabilities into the operand model, the second list of probabilities comprising probabilities associated with the plurality of operands.

15. At least one non-transitory computer-readable medium storing computer-readable instructions that, when executed by one or more computing devices, cause at least one of the one or more computing devices to:
profile context data by capturing database operation history data entries and training context data entries from the context data, the context data comprising entries received from one or more instances of the data analysis application responsive to database operations being performed on tables in the data analysis application;
maintain, for a first set of users, profiled database operation history data and profiled context data for a plurality of database operations performed on a plurality of tables;
generate a plurality of predictive models configured to recommend one or more of: at least one database operation or at least one operand to a second set of users of the data analysis application, each predictive model including a plurality of features corresponding to context data fields from the profiled context data and either a plurality of corresponding database operations or a plurality of operands for recommendation;
receiving an application log entry comprising application context data, the application log entry received responsive to a user of the second set of users selecting a column in a table in the instance of the data analysis application;
select one or more predictive models in the plurality of predictive models based at least in part on the application context data;
generate one or more lists of probabilities by inputting the application context data into the one or more selected predictive models, wherein each list of probabilities comprises a plurality of probability values associated with the plurality of database operations or the plurality of operands;
determine one or more recommendations based at least in part on the one or more lists of probabilities, each recommendation in the one or more recommendations comprising a database operation or an operand; and
transmit the one or more recommendations to the instance of the data analysis application for presentation to the user.

16. The at least one non-transitory computer-readable medium of claim 15, wherein the instructions that, when executed by at least one of the one or more computing devices, cause at least one of the one or more computing devices to generate the plurality of predictive models further cause at least one of the one or more computing devices to, for each predictive model:
determine the plurality of features by selecting the plurality of context data fields from the profiled context data;
determine the plurality of database operations or the plurality of operands for recommendation; and
determine, for each of the plurality of database operations or the plurality of operands, a feature weight for each of the plurality of features, the feature weight corresponding to a measure of predictiveness of the feature with respect to the database operation or operand.

17. The at least one non-transitory computer-readable medium of claim 15, wherein the training context data comprises at least one of project metadata, worksheet metadata, and user metadata.

18. The at least one non-transitory computer-readable medium of claim 15, wherein at least one predictive model is a multinomial logistic classifier.

19. The at least one non-transitory computer-readable medium of claim 15, wherein the application context data comprises at least one of project metadata, worksheet metadata, and user metadata.

20. The at least one non-transitory computer-readable medium of claim 15, wherein the one or more recommendations comprise at least one of a join operation and a union operation.

21. The at least one non-transitory computer-readable medium of claim 15, wherein the one or more selected predictive models comprise an operation model and an operand model and wherein the instructions that, when executed by at least one of the one or more computing devices, cause at least one of the one or more computing devices to generate one or more lists of probabilities by inputting the application context data into the one or more selected predictive models further cause at least one of the one or more computing devices to:
generate a first list of probabilities by inputting the application context data into the operation model, the first list of probabilities comprising probabilities associated with the plurality of operations; and
generate a second list of probabilities by inputting the application context data and the first list of probabilities into the operand model, the second list of probabilities comprising probabilities associated with the plurality of operands.

* * * * *